(12) United States Patent
Resh et al.

(10) Patent No.: US 7,542,239 B2
(45) Date of Patent: Jun. 2, 2009

(54) DISC FLUTTER COMPENSATING SUSPENSION

(75) Inventors: Roger A. Resh, Prior Lake, MN (US); James R. Mahoney, Stewart, MN (US); Sandeepan Bhattacharya, Eagan, MN (US); Jagdish L. Agrawal, Chaska, MN (US); Ravishankar A. Shivarama, Bloomington, MN (US); James A. Fisher, Shakopee, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 422 days.

(21) Appl. No.: 11/284,200

(22) Filed: Nov. 21, 2005

(65) Prior Publication Data
US 2007/0115590 A1   May 24, 2007

(51) Int. Cl.
*G11B 5/58* (2006.01)
*G11B 21/20* (2006.01)
(52) U.S. Cl. .................................. 360/244.3; 360/244.8
(58) Field of Classification Search .............. 360/244.3, 360/244.8
See application file for complete search history.

(56) References Cited

U.S. PATENT DOCUMENTS

| | | | |
|---|---|---|---|
| 5,461,525 A * | 10/1995 | Christianson et al. .... | 360/244.8 |
| 5,471,734 A | 12/1995 | Hatch et al. .............. | 29/603.03 |
| 5,682,669 A | 11/1997 | Harrison et al. .......... | 29/603.06 |
| 5,734,525 A | 3/1998 | Girard ...................... | 360/244.8 |
| 5,914,835 A | 6/1999 | Girard et al. ............. | 360/244.8 |
| 5,986,853 A * | 11/1999 | Simmons et al. ......... | 360/245.9 |
| 5,999,369 A | 12/1999 | Shimizu et al. .......... | 360/244.5 |
| 6,088,192 A | 7/2000 | Riener et al. ............. | 360/266.1 |
| 6,462,910 B1 | 10/2002 | Shimizu et al. .......... | 360/244.8 |
| 6,522,624 B2 | 2/2003 | Budde ...................... | 369/294.3 |
| 6,697,226 B1 | 2/2004 | Narayan et al. ............. | 360/245 |
| 6,738,229 B2 | 5/2004 | Williams .................. | 360/266.1 |
| 6,785,094 B2 * | 8/2004 | Arya et al. ................ | 360/244.3 |
| 6,898,841 B2 * | 5/2005 | Shiraishi .................. | 29/603.04 |
| 6,920,018 B2 | 7/2005 | Oh et al. ................... | 360/244.8 |
| 7,280,316 B1 * | 10/2007 | McCaslin et al. ........ | 360/244.8 |
| 2002/0027127 A1 * | 3/2002 | Yagi et al. ...................... | 216/57 |
| 2002/0181155 A1 * | 12/2002 | Takagi et al. .............. | 360/244.3 |
| 2005/0007702 A1 * | 1/2005 | Oh et al. ...................... | 360/245 |
| 2006/0221503 A1 * | 10/2006 | Watadani et al. ......... | 360/244.8 |

* cited by examiner

*Primary Examiner*—Julie Anne Watko
(74) *Attorney, Agent, or Firm*—Westman, Champlin & Kelly, P.A.

(57) ABSTRACT

A suspension is provided, which has a base, a load beam and a hinge structure. The hinge structure and at least one of the base and the load beam are formed of a single continuous piece of multiple layer laminate material, which includes first and second layers. The hinge structure includes a first beam formed by the first layer and a second beam formed by the second layer. The first layer is absent along the second beam and the second layer is absent along the first beam such that the first and second beams are vertically offset from one another. The first and second beams extend between the base and the load beam.

4 Claims, 14 Drawing Sheets

DISC FLUTTER COMPENSATING SUSPENSION

CROSS-REFERENCE TO RELATED APPLICATION

None.

FIELD OF THE INVENTION

The present invention relates generally to suspensions such as those used in data storage devices, and more particularly but not by limitation to a suspension having a vertically offset hinge structure.

BACKGROUND OF THE INVENTION

Suspensions are used in a variety of different fields for precisely positioning one element relative to another element, wherein one of the elements may be moving relative to the other element. For example, data storage systems use suspensions for positioning transducers relative to storage media.

One type of data storage system is known as a "disc drive", which uses one or more rigid or flexible discs coated with a magnetizable medium for storing information in a plurality of circular, concentric data tracks. The discs are mounted on a spindle motor, which causes the discs to spin and the surfaces of the discs to pass under respective hydrodynamic (e.g., air) bearing disc head sliders. The sliders carry transducers, which write information to and read information from the disc surface. An actuator mechanism moves the sliders from track to track across the surfaces of the discs under control of electronic circuitry. The actuator mechanism includes a track assessing arm, a suspension and a gimbal for each slider, for example. The suspension includes a load beam, which provides a load force that forces the slider toward the disc surface. The gimbal is positioned between the slider and the load beam, or is integrated in the load beam, to provide a resilient connection that allows the slider to pitch and roll while following the topography of the disc.

As track densities continue to increase, it becomes more difficult for the suspension and control circuitry to position the transducer accurately over a desired data track. As a result, storage capacity may be limited. One factor limiting this precision is relative motion between the transducer and the disc limiting this precision is relative motion between the transducer and the disc caused by disc flutter. Disc flutter is characterized by axial motion of the disc due to dynamic excitation from the driving motor, support bearings, and aerodynamic forces within the drive. These excitations set up resonances within the disc platter(s) which have strong axial/vertical displacement components. This vertical response causes a radial displacement of the concentric data tracks. This radial motion can therefore cause misregistration between the transducer relative to the track during track following operations. U.S. Pat. Nos. 5,999,369 and 6,088,192 discuss some of these vibrational modes and some attempts to reduce track misregistration.

Embodiments of the present invention provide solutions to these and other problems, and offer other advantages over the prior art. However, embodiments of the present invention are not limited by or required to provide these or other solutions or advantages.

SUMMARY OF THE INVENTION

One embodiment of the present invention is directed to a suspension having a base, a load beam and a multiple layer hinge structure. The hinge structure and at least one of the base and the load beam are formed of a single contiguous piece of multiple layer laminate material comprising first and second layers. The hinge structure comprises a first beam formed by the first layer and a second beam formed by the second layer. The first layer is absent along the second beam, and the second layer is absent along the first beam such that the first and second beams are vertically offset from one another. The first and second beams extend between the base and the load beam.

Another embodiment of the present invention is directed to a device comprising a proximal section and a distal section, wherein at least one of the proximal and distal sections have a recessed portion and a laterally-offset non-recessed portion. The device further comprises a hinge structure adjacent the recessed and non-recessed portions. The hinge structure comprises first and second laterally offset beams extending between the proximal and distal sections and having top and bottom surfaces. The first beam is attached to the non-recessed portion, and the second beam is attached to the recessed portion such that the top and bottom surfaces of the first beam are vertically offset from the top and bottom surfaces, respectively, of the second beam in a direction normal to the surfaces.

Another embodiment of the present invention is directed to a suspension, which comprises proximal and distal ends and a longitudinal axis extending from the proximal end toward the distal end. A rotating hinge between the proximal and distal ends rotates the distal end about the longitudinal axis in response to vertical motion of the distal end relative to the proximal end. The suspension further comprises a preformed twist deformation, which is confined to an area on the suspension that is entirely distal to the rotating hinge and which twists the distal end about the longitudinal axis relative to the proximal end in a direction opposite to rotation by the rotating hinge.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
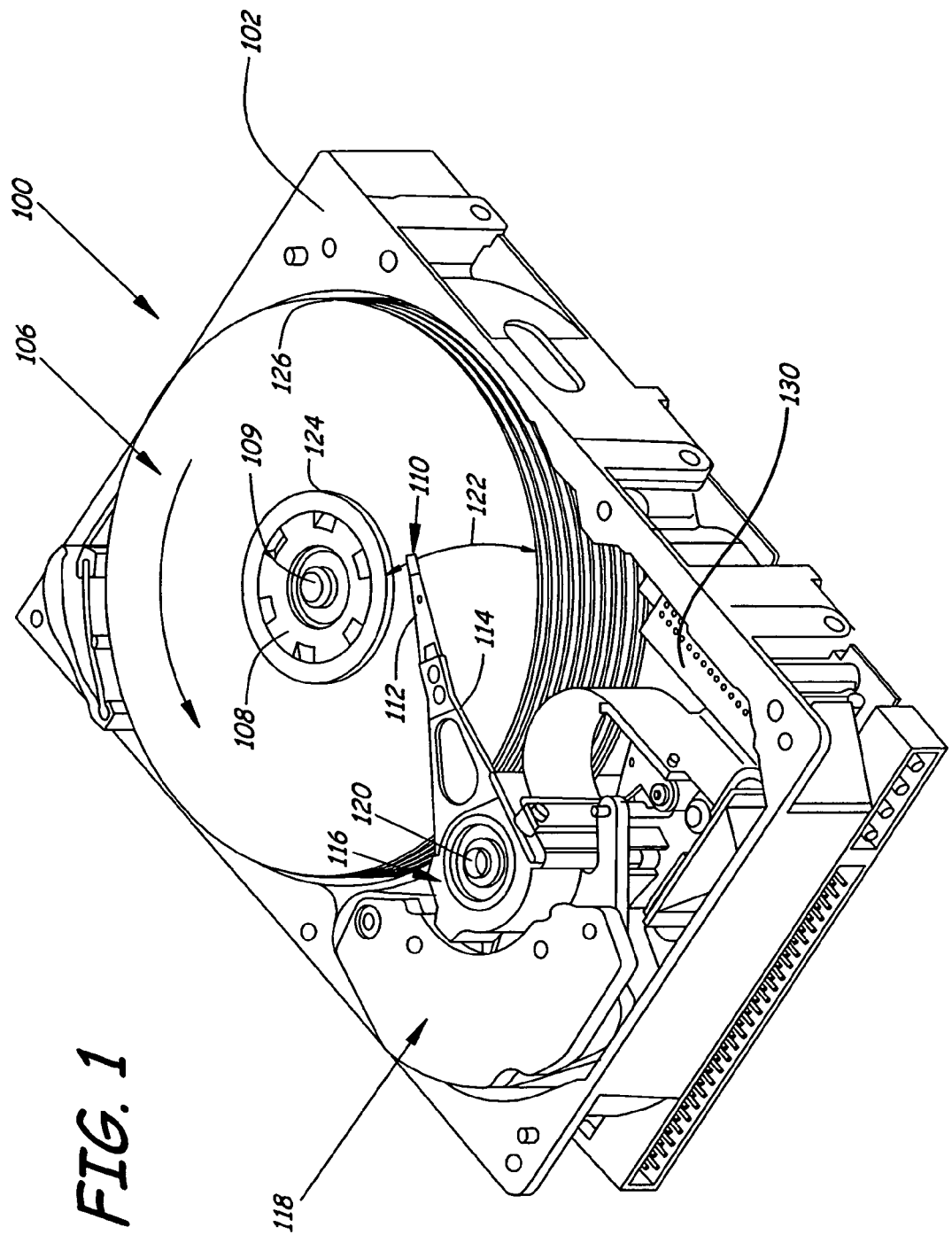
FIG. 1 is a perspective view of a data storage device in which some embodiments of the present invention are useful.

FIG. 1 is a perspective view of a data storage device 100 in which some embodiments of the present invention are useful. In this example, data storage device 100 is a disc drive. However, embodiments of the present invention can be used in other types of data storage devices and in other non-storage applications, such as those applications in which a suspension can be used to position one element relative to another.

In the embodiment shown in FIG. 1, data storage device 100 includes a housing with a base 102 and a top cover (not shown). Data storage device 100 further includes a disc pack 106, which is mounted on a spindle 109 by a disc clamp 108. Disc clamp 108 includes a plurality of individual discs, which are co-rotated about spindle 109 by a spindle motor (not shown) attached to the bottom of the spindle 109. Each disc surface has an associated disc head slider 110, which is mounted to data storage device 100 for communication with the disc surface. As the disc pack is rotated, it generates air circulation through the disc drive and in particular generates a fluid (e.g., air) bearing between each head slider 110 and each disc surface. The bearing surface of each slider can be designed for non-contact, pseudo-contact or direct-contact with the disc surface, for example.

In the example shown in FIG. 1, sliders 110 are supported by suspensions 112, which are in turn supported by track accessing arms (or "actuator arms") 114. Track accessing arms 112 are radially positioned by a first-stage actuator 116. Actuator 116 is of the type known as a rotating moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of servo control circuitry 130. Other types of first-stage actuators can also be used, such as linear actuators.

In addition, disc drive 100 can employ second stage actuators, commonly referred to as microactuators, for example, (not shown) which can be located anywhere along the track accessing arms, suspension, gimbal or slider.

A. Vertical Offset

Figure 2A:
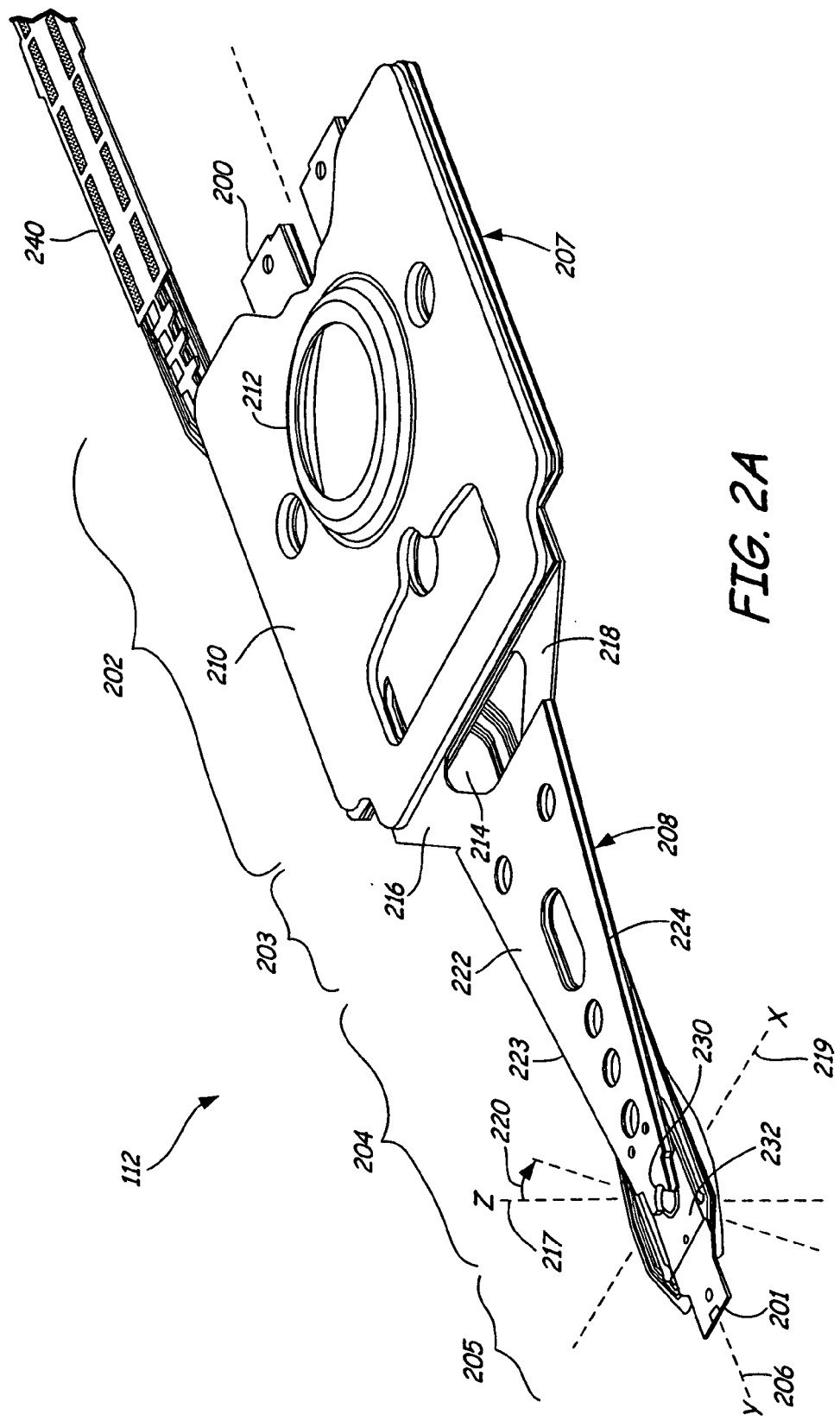
FIG. 2A is a perspective view of the back side of a suspension within the data storage device shown in FIG. 1, according to one embodiment of the present invention.

FIG. 2A is a perspective view of the back side of one of the suspensions 112, according to one embodiment of the present invention. Suspension 112 includes a proximal end 200, a distal end 201, a proximal section 202, a hinge structure 203, a distal section 204 and a preload transfer section 205. Suspension 112 further includes a longitudinal axis 206.

In the example shown in FIG. 2A, proximal section 202 includes a base mounting portion 207, and distal section 204 includes a load beam 208. Base mounting portion 207 is attached to a base plate 210 such as by welding, for example. Base plate 210 has a swage stake hub 212, which is used to mount base plate 210 and suspension112 to a respective actuator arm 114 shown in FIG. 1. Other methods of mounting can also be used.

Hinge structure 203 extends between base portion 207 and load beam 208 and has an aperture 214, which defines a pair of laterally-spaced, flexible beams 216 and 218 that extend from base portion 207 to load beam 208. In one embodiment, beams 216 and 218 are formed with a preload bend (not shown) about an axis transverse to longitudinal axis 206. When suspension 112 is assembled in disc drive 100 (shown in FIG. 1), the preload bend supplies a preload force to slider 110 (also shown in FIG. 1), which forces slider 110 toward the surface of the disc along a vertical, Z-axis 217. Beams 216 and 218 lie in different planes that are vertically offset from one another along Z-axis 217 so that vertical motion of the slider caused by disc flutter (or other vibrational modes, for example) creates an off-track motion along X-axis 219 due to a rotating hinge action provided by hinge structure 203. As the disc moves up and down, a synchronous lateral motion with the moving disc arises, hence minimizing relative motion between the read-write head and the data track. Arrow 220 shows an example of rotation at the distal end 201 caused by upward vertical movement of the slider and the rotating hinge action. Arrow 220 would be reversed for downward vertical motion.

Load beam 208 extends from hinge structure 203 to preload transfer section 205. Load beam 208 has a substantially planar main body portion 222 and a pair of opposing lateral side edges 223 and 224. Load beam 208 transfers the preload force generated by beams 216 and 218 to preload transfer section 205. In one embodiment, side edges 223 and 224 include a pair of respective stiffening rails (not shown), which are bent out-of-plane with respect to the main body portion 222 to provide additional stiffness to the load beam section. However, load beam 208 can be formed with or without stiffening rails in alternative embodiments of the present invention.

Preload transfer section 205 extends generally from the distal end of load beam 208 to the distal end 201 of suspension 112. Preload transfer section 205 has a load point 230 at which the load beam transfers the preload force to the back surface of slider 110 (shown in FIG. 1). A flexure or gimbal 232 is attached between load beam 208 and slider 110 (or is alternatively integral with the load beam) to allow the slider to pitch and roll while following the topography of the disc.

A flex circuit 240 is routed along and is supported by suspension 112 for carrying electrical conductors that communicate with the read and write transducers carried by the slider.

In addition, the various elements of suspension 112 include one or more alignment holes or apertures, which are used for alignment purposes when attaching the various elements together. In addition, the alignment holes can provide access points for welding purposes.

Figure 2B:
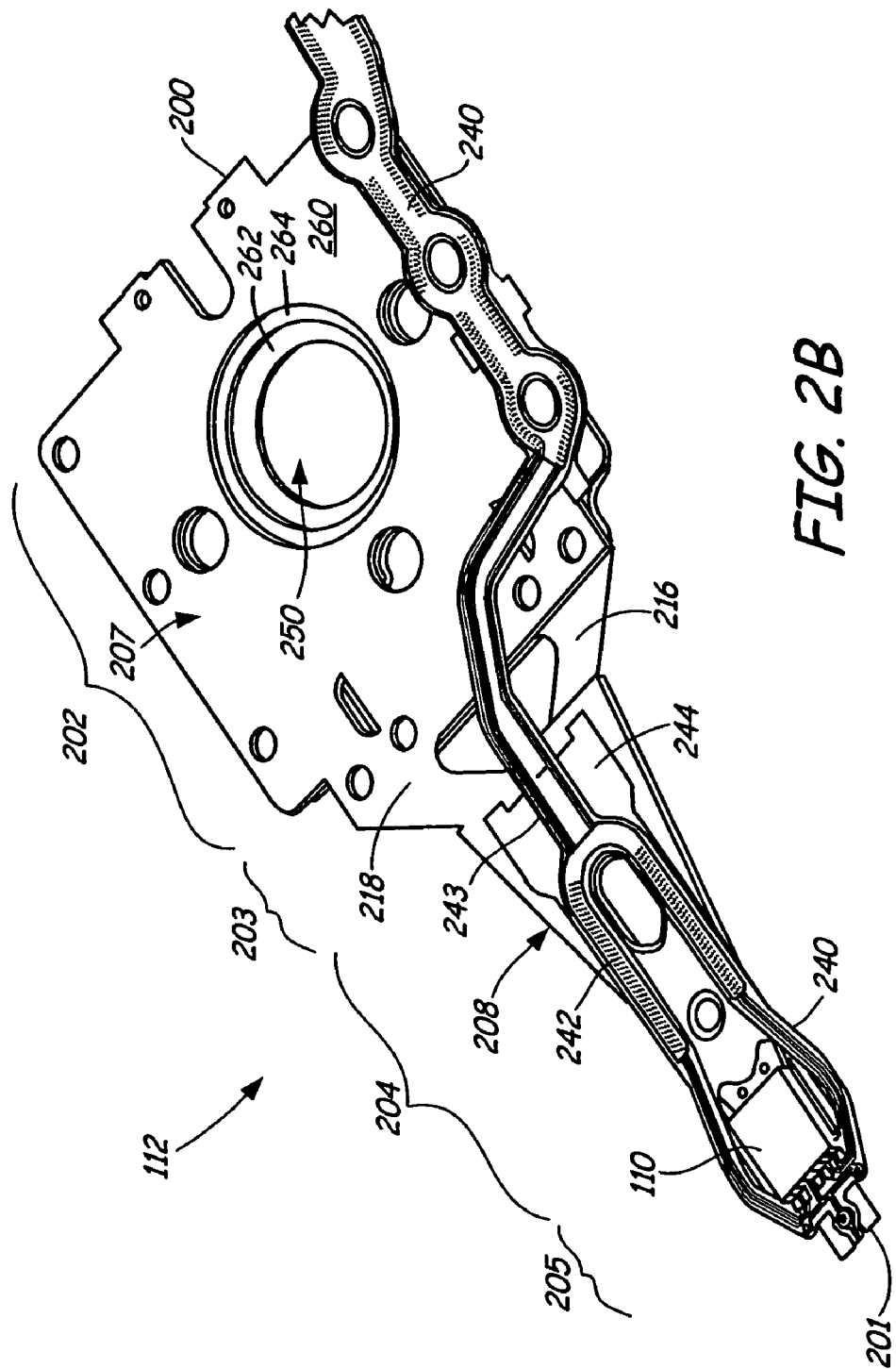
FIG. 2B is a perspective view of the suspension, as viewed from the disc surface.
Figure 2C:
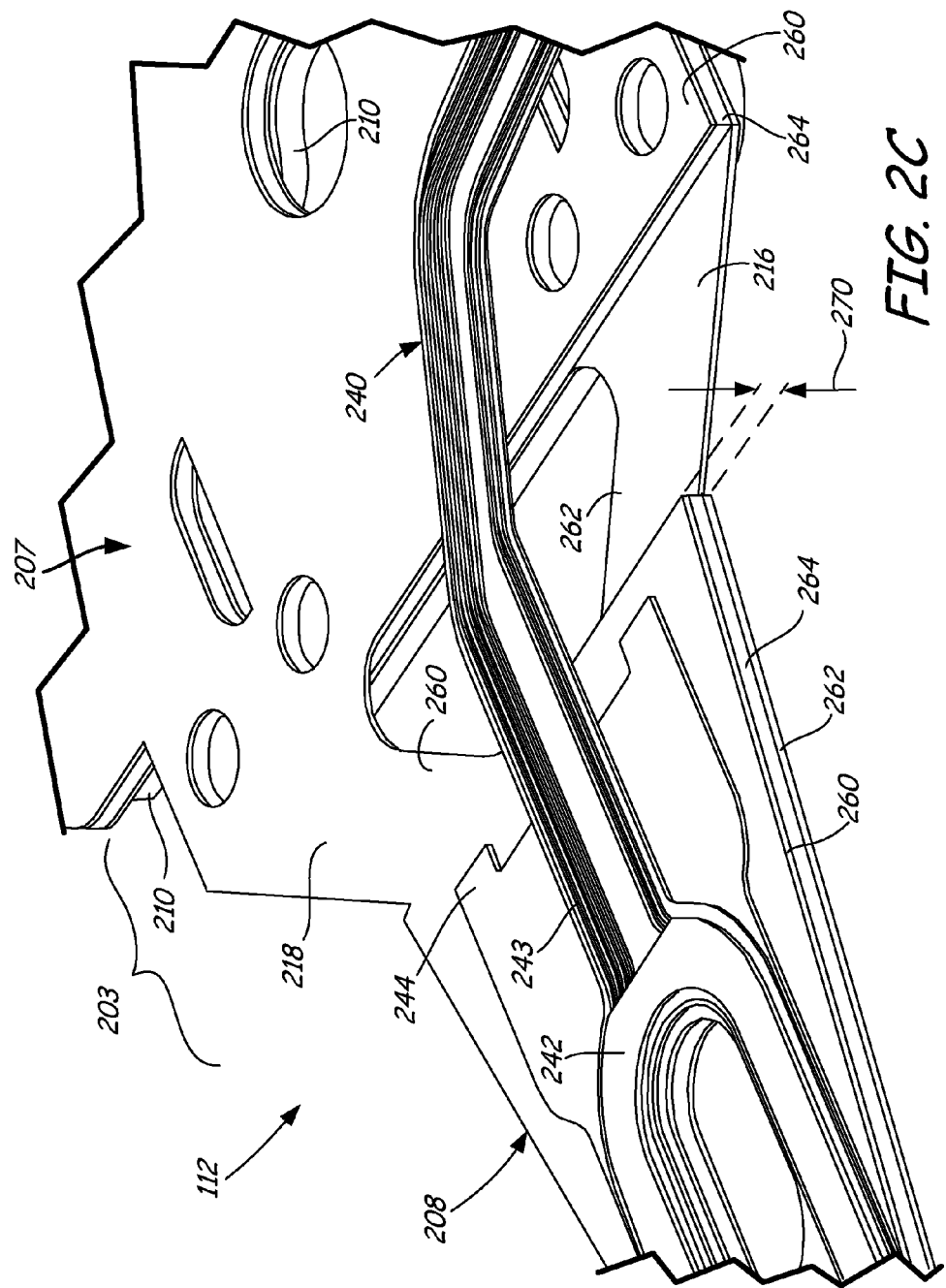
FIG. 2C is an enlarged, fragmentary view of the suspension shown in FIGS. 2A and 2B.

FIG. 2B is a perspective view of suspension 112, as viewed from the disc surface. FIG. 2C is an enlarged, fragmentary view of suspension 112 as viewed from the same direction as FIG. 2B. FIG. 2B illustrates flex circuit 240 routed along suspension 112 from proximal end 200 to distal end 201. In this embodiment, flex circuit 240 includes a top cover coat 242, a circuit layer 243, comprising signal traces and insulating dielectric material, and a bottom stainless steel layer 244. Stainless steel layer 244 can be welded or otherwise attached to the bottom surfaces of suspension 112.

Referring to FIG. 2C, base portion 207, hinge structure 203 and load beam 208 have a multiple layer construction with a bottom layer 260, a top layer 262 and an intermediate core layer 264, which are laminated together. In one embodiment, the top and bottom layers 260 and 262 are formed of thin sheets of metal, such as stainless steel, while core layer 264 is formed of a non-metal, such as polyimide. These layers can be connected together by a suitable method, such as with a pressure sensitive or other adhesive, for example. However, any other suitable materials can be used in alternative embodiments. Also, each layer can have any suitable thickness. For example in one embodiment, the top and bottom layers 260 and 262 have a thickness of 0.001 inches and core layer 264 has a thickness of 0.003 inches.

FIG. 2C also illustrates a vertical offset 270 between beams 216 and 218 in greater detail. In this embodiment, the material of bottom layer 260 and core layer 264 is absent along substantially the entire length of beam 216, leaving only the material of top layer 262 of the multi-layer suspension 112. In contrast, the material of top layer 262 and core layer 264 is absent along substantially the entire length of beam 218, leaving only the material of bottom layer 260. As a result, beam 216 lies in a different plane than beam 218 since beam 216 is formed by the top material layer and beam 218 is formed by the bottom material layer.

In an alternative embodiment, the core material 264 can remain on one or both of the beams 216 and 218 while still maintaining the vertical offset 270. The vertical offset 270 can be achieved with little or no incremental cost addition in substantially all existing laminated suspension designs. Existing laminated suspensions can simply be etched or otherwise processed along beams 612 and 218 to remove the desired material layers and thereby obtain the vertical offset. Alternatively, beams 216 and 218 (and any of the other elements of suspension 112) can be formed by an additive process instead of a material removal process.

In the embodiment shown in FIGS. 2A-2C, base portion 207, load beam 208 and hinge structure 203 are contiguous, in which bottom layer 260 and top layer 262 extend continuously through base portion 207, hinge structure 203 and load beam 208. However, one or more of these sections can be formed as separate pieces of material that are attached to one another in alternative embodiments of the present invention.

Referring back to FIG. 2B, top layer 262 is attached to base plate 210 along base portion 207. Base portion 207 has an aperture 250, which is aligned with swage stake hub 212 (shown in FIG. 2A). The various layers of base portion 207 are staggered in order to expose top layer 262 so that it can be welded or otherwise attached to base plate 210 (shown in FIG. 1A).

Figure 3A:
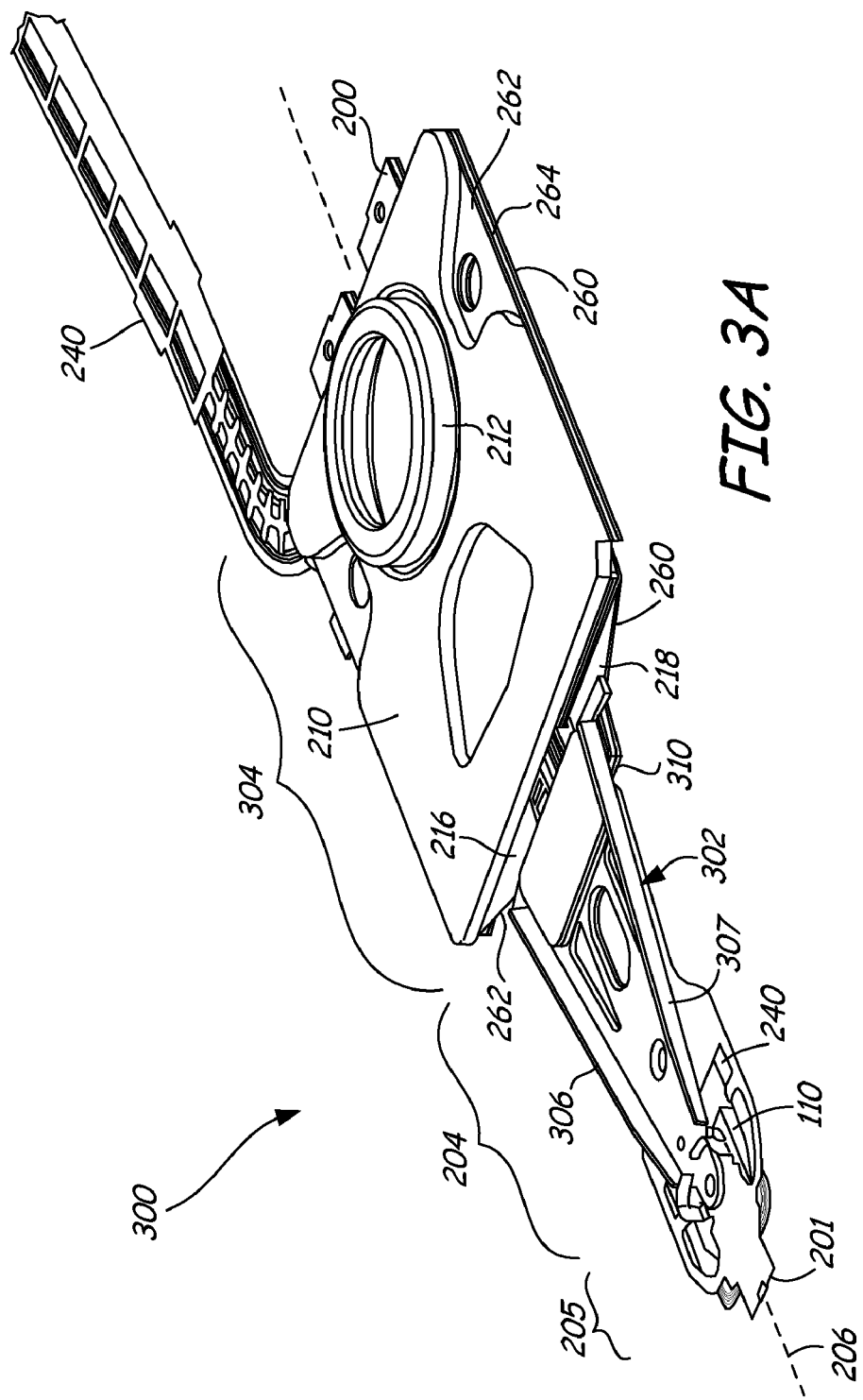
FIG. 3A is a perspective view of the back side of a suspension according to an alternative embodiment of the present invention.
Figure 3B:
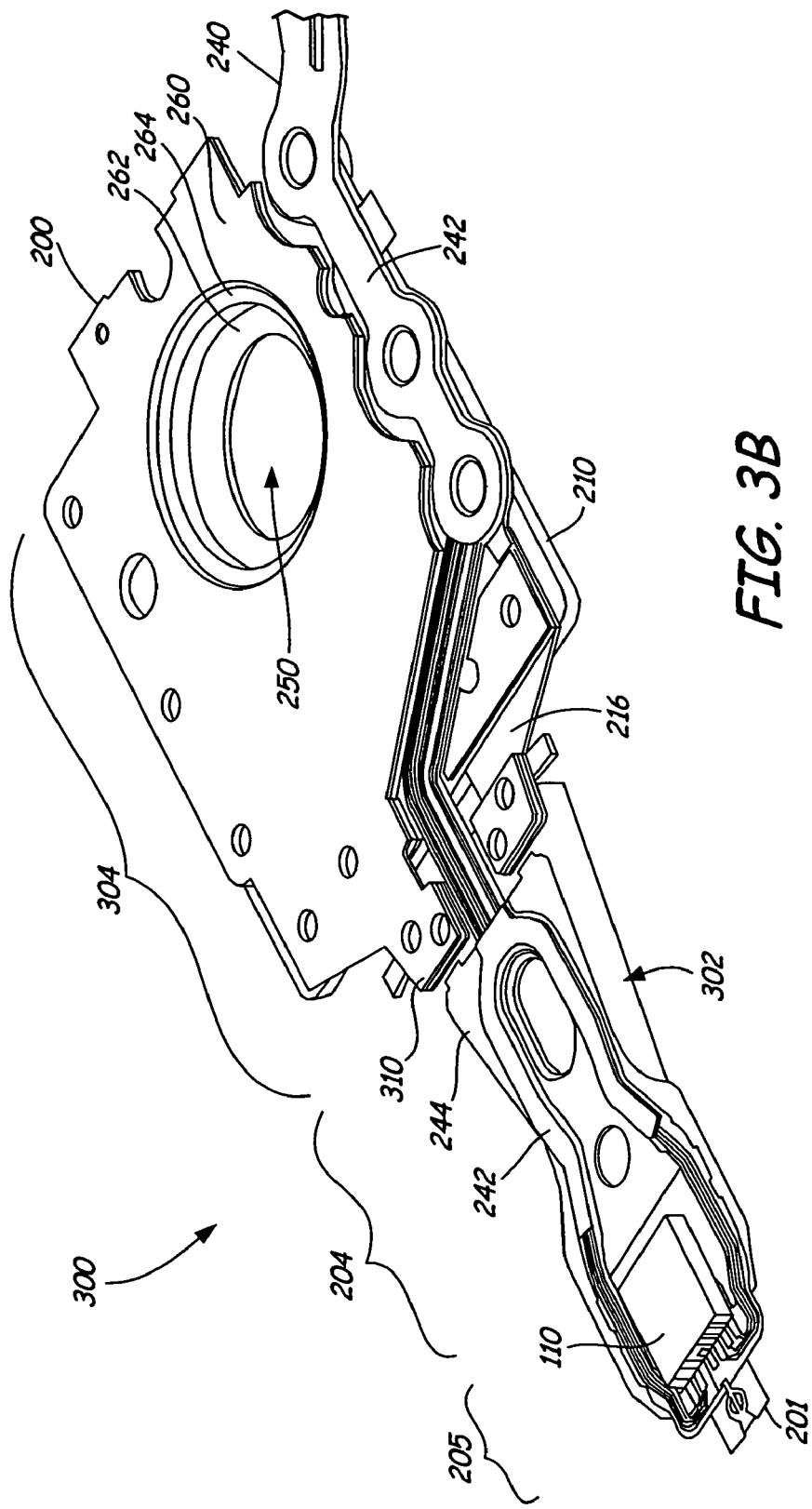
FIG. 3B is a perspective view of the suspension shown in FIG. 3A, as viewed from the disc surface.
Figure 3C:
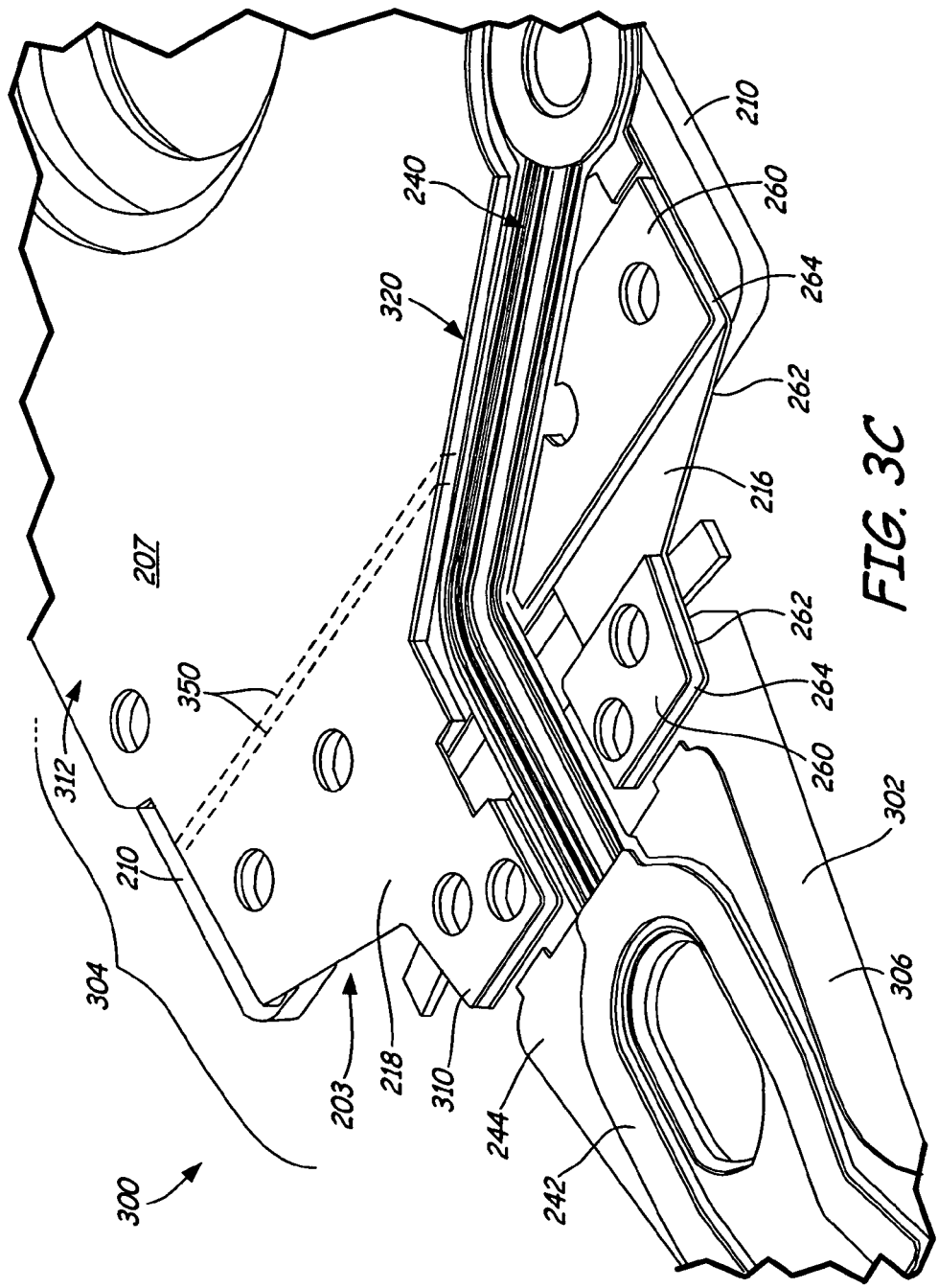
FIG. 3C is an enlarged, fragmentary view of the suspension shown in FIGS. 3A and 3B.

FIGS. 3A-3C are perspective views of a suspension 300 in which the base portion 207 and the hinge structure 203 are formed as a separate piece of laminate material, which is attached to load beam 302, according to an alternative embodiment of the present invention. The same reference numerals are used in FIGS. 3A-3C as were used in FIGS. 2A-2C for the same or similar elements. FIG. 3A illustrates suspension 300 as viewed from the backside of the suspension relative to the disc surface. FIG. 3B illustrates suspension 300 as viewed from the disc surface.

Suspension 300 includes a load beam 302 and a contiguous hinge-base section 304. In this embodiment, load beam 302 is formed of a single layer of stainless steel and includes a pair of stiffening rails 306 and 307, which are bent out-of-plane with respect to the main body portion of load beam 302. However, load beam 306 can have a multiple layer construction and can be formed with or without stiffening rails in alternative embodiments of the present invention. Load beam 302 has a distal end, which supports slider 110.

Hinge-base section 304 has multiple layers, including a bottom layer 260, a top layer 262 and a core layer 264, similar to the embodiment shown in FIGS. 2A-2C. The distal end 310 of hinge-base section 304 is attached to the proximal end of load bean 302. The proximal end of hinge-base section 304 is attached to base plate 210. In this example, top 262 is welded to the bottom surface of load beam 302 and to the bottom surface of base plate 210. Other attachment methods and arrangements can also be used.

Similar to the embodiment shown in FIGS. 2A-2C, layers 260, 262 and 264 are selectively removed, such as by etching or another process, so that beams 216 and 218 are vertically offset from one another and lie in different planes. In this example, bottom layer 260 and core layer 264 are removed along beam 216 such that beam 216 is formed only of top layer 262. Top layer 262 and core layer 264 are removed along beam 218 such that beam 218 is formed of only bottom layer 264. Again, core layer 264 can be left remaining on one or both the beams 216 and 218 in alternative embodiments.

FIG. 3C is an enlarged, fragmentary view of suspension 300 illustrating the hinge-base section 302 in greater detail. Bottom layer 260 and core layer 264 are removed from the area of beam 216, and top layer 262 and core layer 264 are removed from the area of beam 218 to provide the vertical offset between the two beams. In addition, hinge-base section 304 includes a channel 320 for receiving flex circuit 240 such that the flex circuit is recessed within hinge-base section 304. In this example, channel 320 is formed by removing bottom layer 260 and core layer 264 along the path of channel 320. This creates a partially enclosed channel that extends from the side edge of the base portion to the center of the proximal end of load beam 302. Flex circuit 240 can be attached to top layer 262 within channel 320. Recessing flex circuit 240 within hinge-base section 304 protects the flex circuit from windage caused by the rotating discs during operation. However, flex circuit 240 can simply be attached to the surface of bottom layer 260 in an alternative embodiment of the present invention.

In a further embodiment, hinge structure 203 is formed as a separate element from base portion 207. For example, hinge structure 203 can be separated from base portion 207 along dashed lines 350. In this embodiment, the top layer 262 of hinge structure 203 would be attached to the opposing surface of base plate 210, and the top surface 262 of base portion 207 would be attached to the opposing surface of base plate 210. In another alternative embodiment, hinge structure 203 could be attached to base portion 207.

Figure 4:
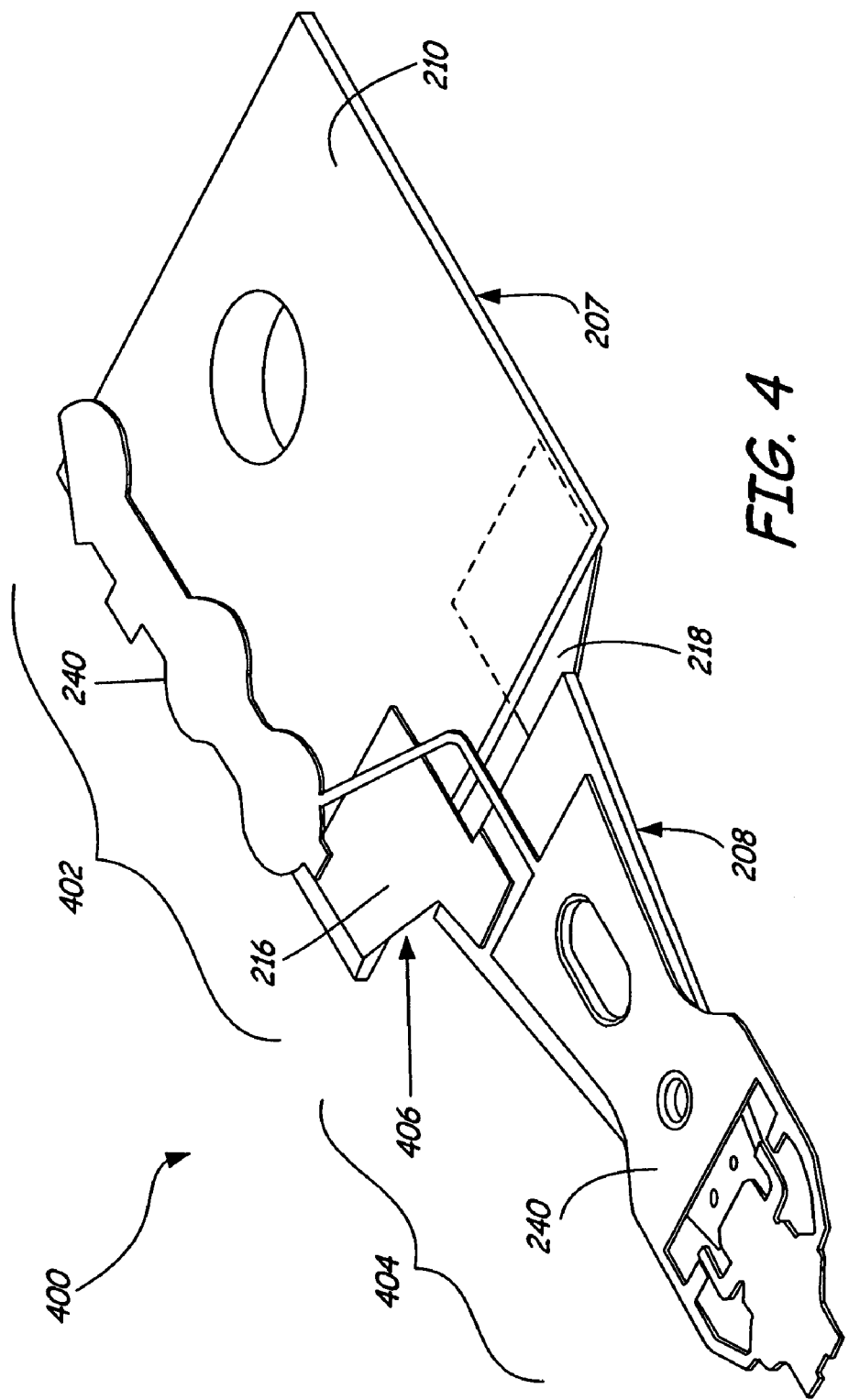
FIG. 4 is a perspective view of the back side of a suspension according to another alternative embodiment of the present invention.

FIG. 4 is a perspective view of the backside of a suspension 400 according to another alternative embodiment of the present invention. Again, the same reference numerals are used in FIG. 4 as were used in the previous figures for the same or similar elements. Suspension 400 includes a proximal section 402, a distal section 404 and a hinge structure 406 therebetween. Proximal section 402 includes base plate 210, and distal section 404 includes load beam 208. Load beam 208 can include a single or multiple-layer construction, with or without stiffening rails. Hinge structure 406 includes beams 216 and 218, which are laterally and vertically offset from one another. Beams 216 and 218 are formed of separate pieces of material, such as single-layer sheets of stainless steel. However, beams 216 and 218 can be formed of other single or multiple-layer materials. Beam 216 is attached to the top surface of base plate 210 and to the top surface of load beam 208, whereas beam 218 is attached to the bottom surface of base plate 210 and the bottom surface load beam 208.

Attachment to opposite surfaces of base plate 210 and/or opposite surfaces of load beam 208 vertically offsets the two beams from one another in a direction normal to the beam surfaces.

In an alternative embodiment, one end of beams 216 and 218 are attached to the same surface of load beam 218 and the other end of beams 216 and 218 are attached to opposite surfaces of base plate 210. In another alternative embodiment, one end of beams 216 and 218 are attached to opposite surfaces of load beam 208 and the other end of beams 216 an 218 are attached to the same surface of base plate 210. Also, the material that forms beams 216 and 218 can be expanded to cover larger portions or the entire surface of base plate 210. Also, one or both of the beams 216 and 218 can be formed out of the top or bottom layer of a multiple-layer load beam in an alternative embodiment of the present invention. Additional variations can also be made within the present invention.

Figure 5:
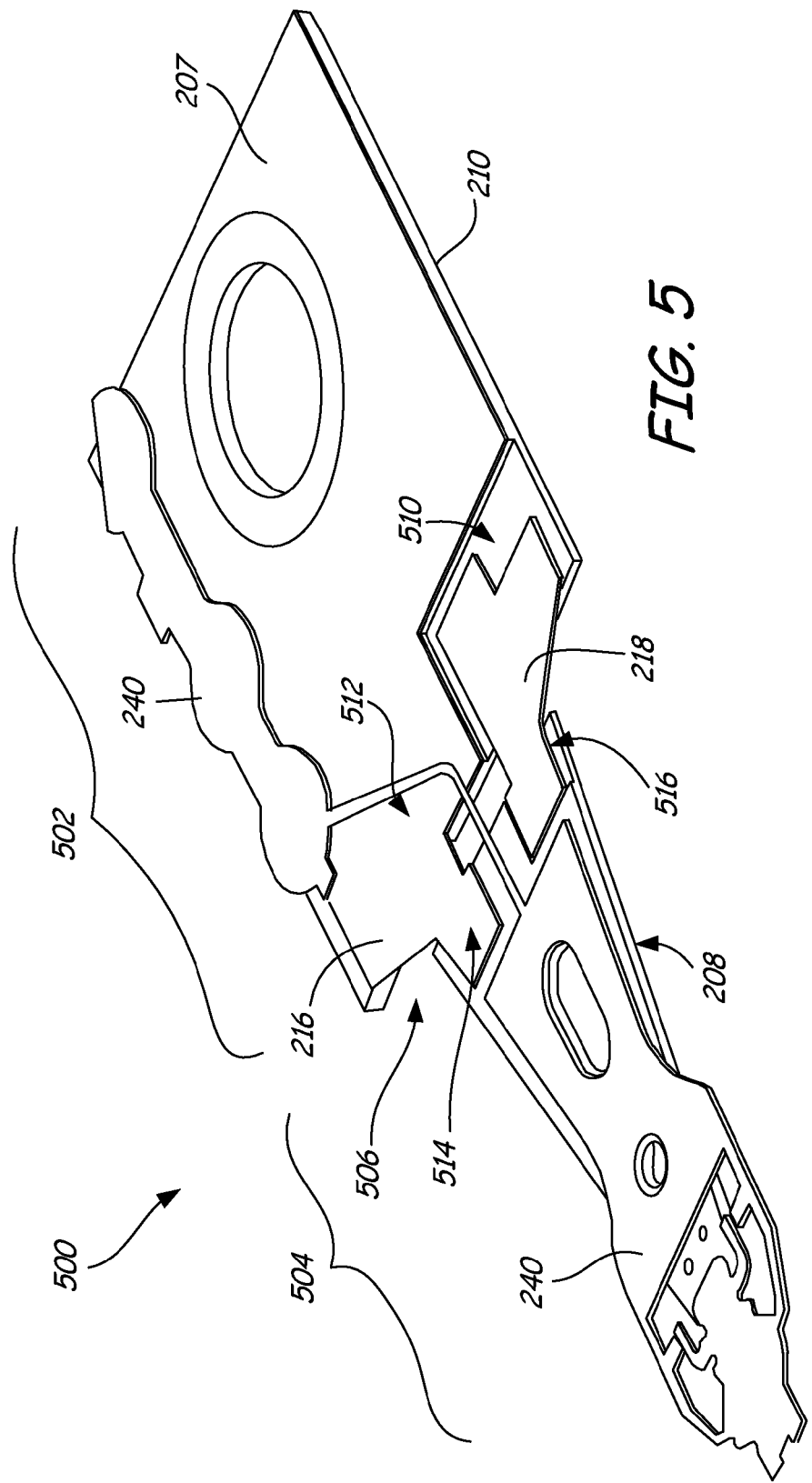
FIG. 5 is a perspective view of the back side of a suspension according to another alternative embodiment of the present invention.

FIG. 5 is a perspective view of a suspension 500 according to another alternative embodiment of the present invention. The same reference numerals are used in FIG. 5 as were used in the previous figures for the same or similar elements. Suspension 500 includes a proximal section 502, a distal section 504 and a hinge structure 506. In this embodiment, beams 216 and 218 are formed of separate pieces of material, such as sheets of stainless steel. The material forming beam 216 is contiguous with the material forming base portion 207, which extends over and is attached to base plate 210. Base plate 210 includes a recessed portion 510 and a non-recessed portion 512 that are adjacent to hinge structure 506. Beam 216 is attached to non-recessed portion 512, and beam 218 is attached to recessed portion 510. Similarly, the proximal end of the back surface of load beam 208 includes a non-recessed portion 514 and a recessed portion 516 that are adjacent to hinge structure 506. Beam 216 is attached to non-recessed portion 514, and beam 218 is attached to recessed portion 516.

Recessed portions 510 and 516 can be formed by any method such as partial etching or stamping. In one embodiment, base plate 210 and load beam 208 have the same thickness, and recessed portions 510 and 516 have the same depth relative to the non-recessed portions 512 and 514. However, recessed portions 510 and 516 can have different depths in alternative embodiments.

In a further embodiment, base plate 210 includes a further recessed portion on the bottom surface of the base plate, directly opposite to recessed portion 510 and which is a mirror image of recessed portion 510. Placing a similar recesses on opposing surfaces of base plate 210 allows for improved flatness control, especially for stamping processes.

Figure 6:
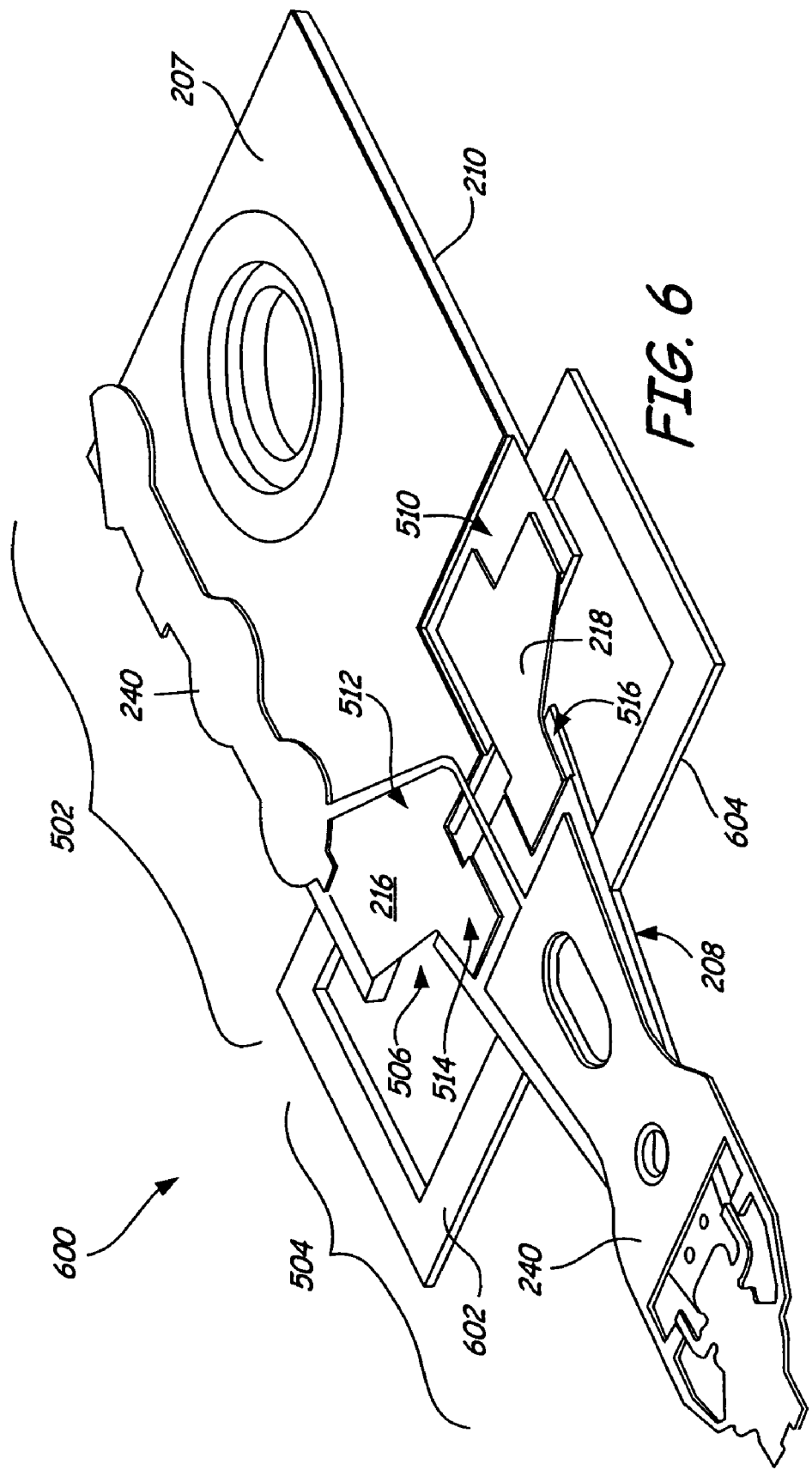
FIG. 6 is a perspective view of the back side of a suspension according to another alternative embodiment of the present invention.

FIG. 6 is a perspective view of a suspension 600 during an intermediate stage of manufacture, according to one embodiment of the present invention. Suspension 600 is similar to suspension 500 shown in FIG. 5, and the same reference numerals are used in FIG. 6 as were used in FIG. 5 for the same or similar elements. In this embodiment, load beam 208 and base plate 210 are initially formed as a single, contiguous piece of material with struts 602 and 604. Recessed portions 510 and 516 are etched from the material at the same time such that the partial etching results in the same step depth in both base plate 210 and load beam 208. Base plate 210 and load beam 208 can then be separated from one another by removing struts 602 and 604 later in the assembly process.

Figure 7:
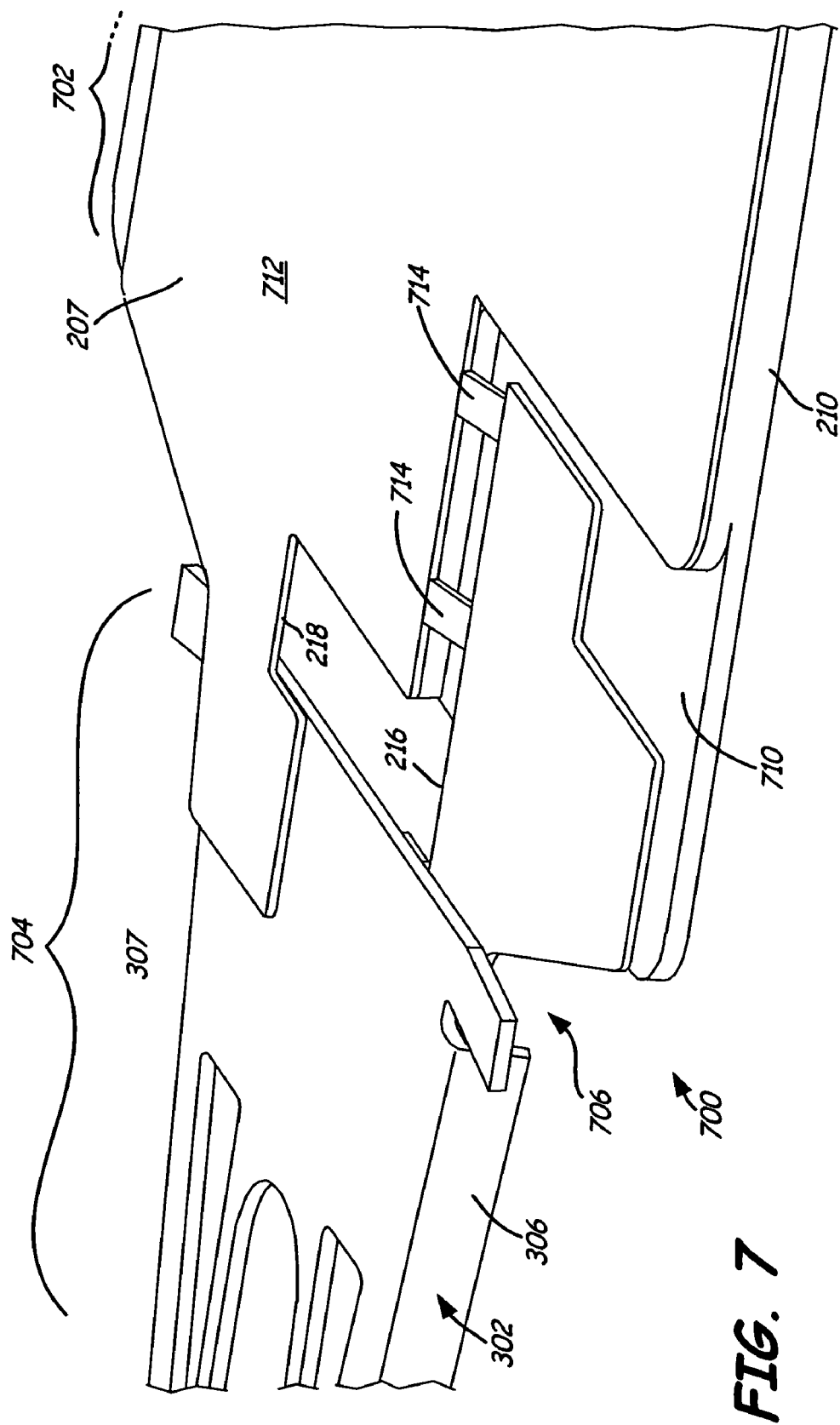
FIG. 7 is a perspective view of a suspension according to another alternative embodiment of the present invention.

FIG. 7 is a perspective view of a suspension 700 according to another alternative embodiment of the present invention. The same reference numerals are used in FIG. 7 as were used in the previous figures for the same or similar elements. Suspension 700 includes a proximal section 702, a distal section 704 and a hinge structure 706. In this embodiment, beams 216 and 218 are formed with base portion 207 as a single, continuous piece of material, such as a sheet of stainless steel. The material forming base portion 207 extends over and is attached to base plate 210. Base plate 210 includes a recessed portion 710 and a non-recessed portion 712 that are adjacent to hinge structure 706. Beam 216 is attached to recessed portion 710, and beam 218 is attached to non-recessed portion 712. Base portion 207 includes one or more struts 714, which connect the material of base portion 207 that is attached to recessed portion 710 with the material of base portion 207 that is attached to non-recessed portion 712. Base portion 207 and beams 216 and 218 can therefore be fabricated as a single, continuous piece of material with no additional alignment. During assembly, struts 714 are bent downward to allow the proximal end of beam 216 to be fixed to recessed portion 710.

Similar to the embodiment shown in FIGS. 3A-3C, distal section 704 includes a load beam 302 formed of a single layer of stainless steel and including a pair of stiffening rails 306 and 307, which are bent out-of-plane with respect to the main body portion of load beam 302. However, load beam 306 can have a multiple layer construction and can be formed with or without stiffening rails in alternative embodiments of the present invention. Beam 216 is attached to one surface of load beam 302, and beam 218 is attached to an opposite surface of load beam 302 due to the offset provided by recessed portion 710.

With this embodiment, the recess in the base plate is sufficient to create the vertical offset between the preload beams 216 ad 218. The size of the gap (g) is a direct function of the depth (d) of the recess in base plate 210 and the thickness (t) of the hinge material, wherein g=d−t. In order to maintain the offset or gap (g) on the load beam side, the preload beams 216 and 218 are welded, for example, to opposite sides of load beam 302. If the load beam thickness is "g", the preload beams 216 and 216 will be parallel to one another.

This embodiment reduces variation in the part performance due to the load beam thickness and flatness having much less tolerance compared to the tolerance of the depth and flatness of a recess formed in the load beam, similar to the embodiment shown in FIG. 5.

In an alternative embodiment, the recessed structure is applied to load beam 302 instead of or in addition to base plate 210. A recess can be formed in load beam 302 adjacent hinge structure 706, wherein one of the beams 216 and 218 are attached to the recessed portion and the other of the beams is attached to the non-recessed portion of the load beam. The other ends of beams 216 and 218 can be attached to the same or opposite surfaces of base plate 210. Similar struts 714 can be used to link the recessed and non-recessed ends of beams 216 and 218 on the load beam side, if desired.

B. Twist

Several embodiments have been described above, which modify the suspension to enable the recording head to better follow the tracks on a fluttering disc. For example, a relative z-height offset is added to the preload bend beams. These suspensions can be referred to as Disc Flutter Compensating (DFC) suspensions.

Modeling of the frequency response functions (FRFs) and actual data have shown that this vertical offset can lead to an increase in contribution of the second bending mode to the head off-track motion. The vertical offset of the preload beams causes a rotation (arrow 220 in FIG. 2A) about the longitudinal suspension axis for a vertical displacement of the recording head. The rotation causes a synchronized motion of the recording head with the disc track, minimizing relative motion for disc vibrational modes. However, this rotation can also cause an increase in the off-track contribution due to the second bending mode.

Figure 8:
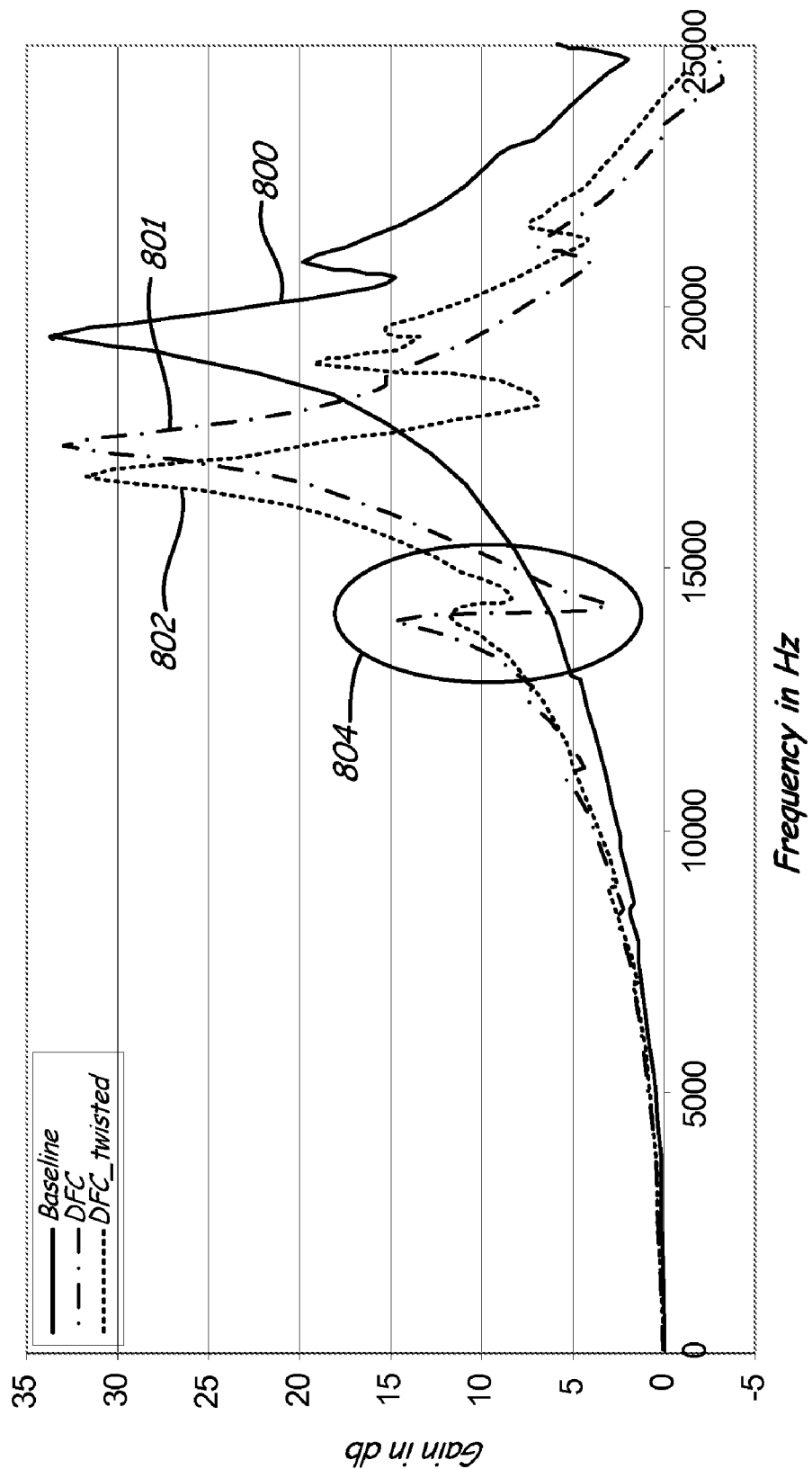
FIG. 8 is a graph, which illustrates a frequency response function of several suspensions due to horizontal base plate excitation.

FIG. 8 illustrates the frequency response function due to horizontal base plate excitation. FIG. 8 is a graph, which plots gain in dB as a function of frequency in Hz. Line 800 represents a baseline suspension having no vertical offset between the preload beams, line 801 represents a DFC suspension having vertical offset between the preload beams, and line 802 represents a DFC suspension further including a localized twist as described in more detail below with respect to FIGS. 9A and 9B. Off-track motion due to the second bending mode is highlighted by area 804. The DFC suspension has a relatively large second bending mode contribution, while the DFC suspension with localized twist has a reduced second bending mode contribution.

By pre-forming a local twist in the load beam, distal to the preload beams and opposite to the direction rotation due to the vertical offset beams, it is possible to reduce off-track motion due to the second bending mode while not sacrificing the off-track sensitivity of the head to vertical excitation. Localizing the twist maintains the ability to follow the disc as a DFC suspension. The location of the twist and the twist angle are knobs that can be adjusted to optimize the second bending mode contribution to off-track head motion.

Figure 9A:
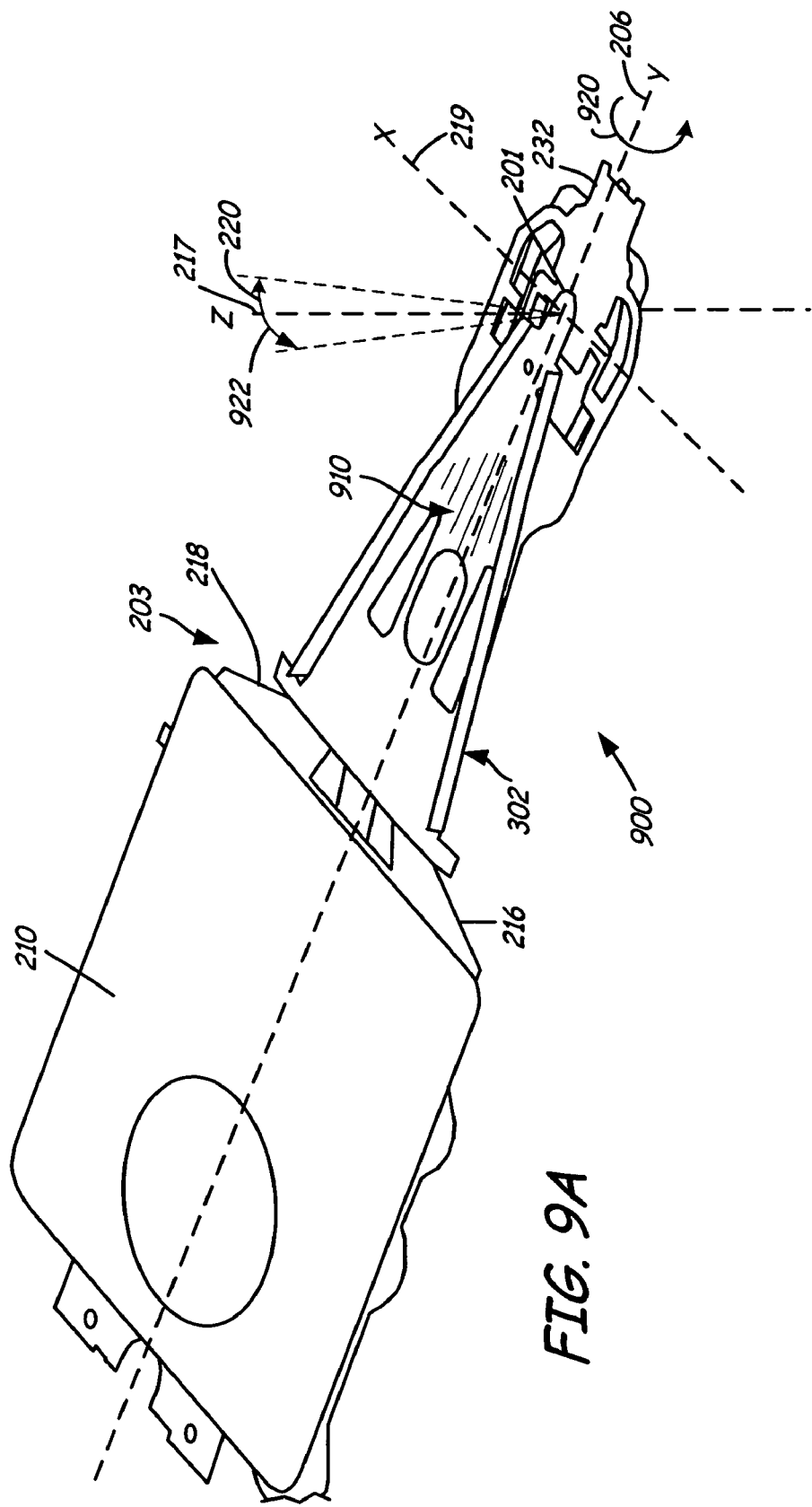
FIG. 9A is a perspective view of a disc flutter compensating suspension having a localized twist in the load beam according to one embodiment of the present invention.

FIG. 9A is a perspective view of a DFC suspension 900 having a localized twist in the load beam according to one embodiment of the present invention. Suspension 900 is similar to suspension 700 shown in FIG. 7 but has a shim (shown in FIG. 7B) between load beam 302 and beam 218 instead of a recess in base plate 210. In addition, both beams 216 and 218 are attached to the same side of load beam 302 instead of opposite sides. The shim vertically offsets beam 216 relative to beam 218.

Suspension 900 is attached to base plate 210 and carries a flexure 232 at its distal end. Similar to the embodiments discussed above, the vertical offset between beams 216 and 218 creates an off-track motion along X-axis 219 in response to vertical motion of the slider due to a rotating hinge action provided by hinge structure 203. Beams 216 and 218 can be vertically offset according to any of the embodiments discussed above and/or by tilting the suspension relative to base plate 210. Arrow 220 shows an example of rotation at the distal end 201 caused by vertical movement of the slider and the routing rotating hinge action.

In order to counteract and reduce the second bending mode contribution to off-track motion, load beam 302 further includes a localized, preformed twist 910 about its longitudinal axis 206. In one embodiment, longitudinal axis 206 extends through the center of the swage area and the center of the dimple in flexure 232. Twist 910 is preformed by bending or deforming an area of load beam 302 such that distal end 201 becomes rotated relative to a proximal end of the load beam in a static state, as shown by arrow 920. In one embodiment, twist 910 has a twist angle 922 of approximately 2-3 degrees about longitudinal axis 206. However, other twist angles outside of this range can be used in alternative embodiments of the present invention.

At second bending mode frequencies, twist 910 has the effect of rotating distal end 201 about longitudinal axis 206 in a direction opposite to rotation 220 by the rotating hinge, in response to the vertical motion of the distal end.

Figure 9B:
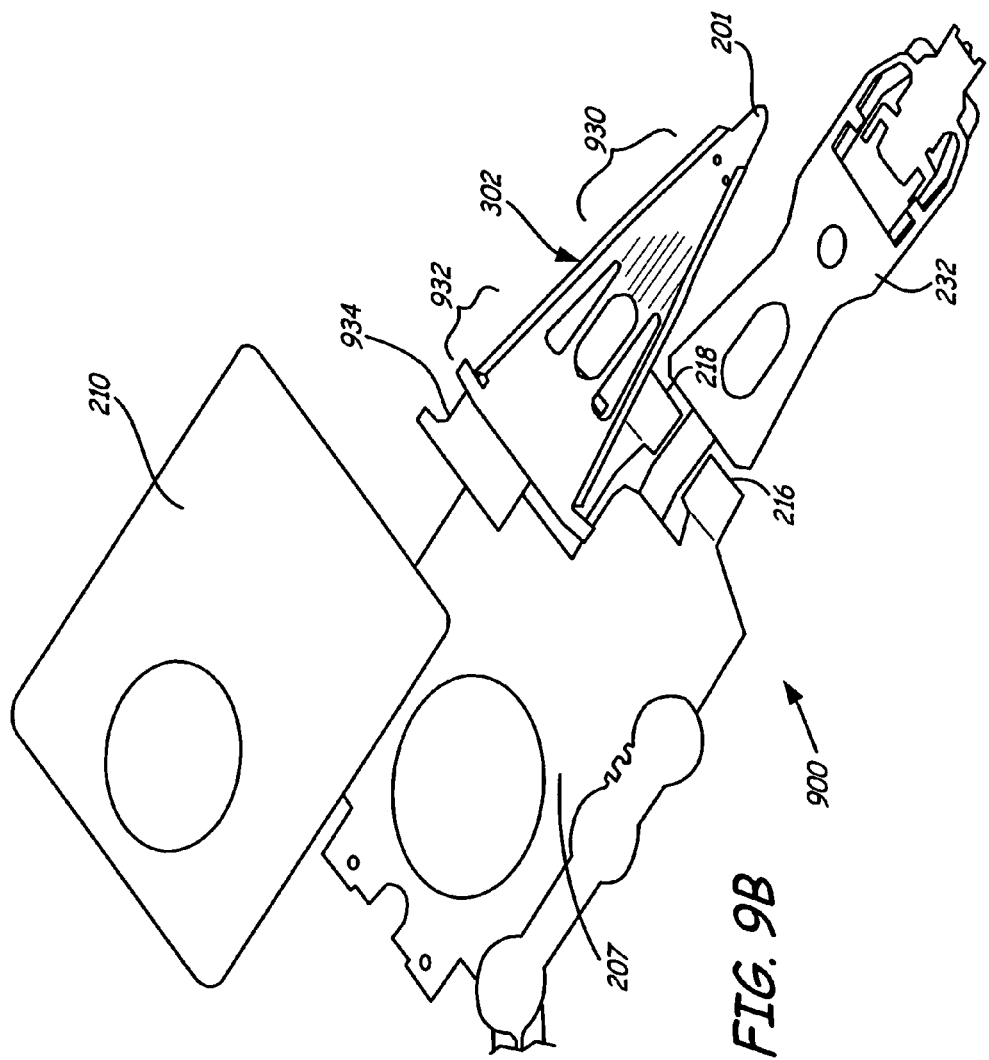
FIG. 9B is an exploded view of the suspension shown in FIG. 9A.

FIG. 9B is an exploded view of the suspension 900 shown in FIG. 9A. In this embodiment, load beam 302 is formed of a single layer of stainless steel. However, load beam 306 can be formed of other materials and can have a multiple layer construction, with or without stiffening rails in alternative embodiments of the present invention. Shim 934 is positioned between load beam 302 and preload beam 218 for vertically offsetting beam 218 relative to beam 216. Shim 934 can also result in load beam 302 being tilted relative to base plate 210 about the longitudinal axis of suspension 900. If load beam 302 is tilted, beams 216 and 218 can lie in the same plane as one another or in different planes. Alternatively, shim 934 can be replaced with one or more of the features discussed above for vertically offsetting beam 216 relative to beam 218.

The static deformation in load beam 302 that creates twist 910 is confined to an area 930 that is entirely distal to hinge structure 203. In one embodiment, area 930 is confined between and not overlapping an area 932 at the proximal end of the load beam, where preload beams 216 and 218 are attached, and distal end 210 of load beam 302. In this embodiment, the proximal area 932 and the distal end 201 are free of any preformed material deformation that creates twist in these areas about longitudinal axis 206. Twist 910 is localized to area 930. This localization allows the twist to reduce off-track head motion due to the second bending mode while not sacrificing the off-track sensitivity of the head to vertical excitation.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension or device while maintaining substantially the same functionality without departing from the scope and spirit of the present invention. In addition, although the preferred embodiment described herein is directed to a suspension for supporting a transducer in a data storage system, it will be appreciated by those skilled in the art that the teachings of the present invention can be applied to non-storage applications in which suspensions are used to suspend and object, without departing from the scope and spirit of the present invention.

What is claimed is:

1. A suspension comprising:
    a base comprising a flex circuit channel;
    a load beam;
    a hinge structure, wherein the hinge structure and at least one of the base and the load beam are formed of a single continuous piece of multiple layer laminate material comprising first and second layers, and wherein the hinge structure comprises a first beam formed by the first layer and a second beam formed by the second layer, wherein the first layer is absent along the second beam and the second layer is absent along the first beam such that the first and second beams are vertically offset from one another, the first and second beams extending between the base and the load beam, wherein the flex circuit channel is defined by at least one of the layers in the multiple layer structure being at least partially absent along the channel; and
    a flex circuit, which is positioned within and extends along the flex circuit channel such that the flex circuit is at least partially recessed within the flex circuit channel.

2. The suspension of claim 1 wherein the multiple layer laminate material further comprises a third, core layer positioned between the first and second layers.

3. The suspension of claim 2 wherein the core layer is absent along substantially the entire length of at least one of the first and second beams.

4. The suspension of claim 1 wherein the base, the hinge structure and the load beam are together formed of the single contiguous piece of multiple layer laminate material.

* * * * *

UNITED STATES PATENT AND TRADEMARK OFFICE
CERTIFICATE OF CORRECTION

PATENT NO. : 7,542,239 B2
APPLICATION NO. : 11/284200
DATED : June 2, 2009
INVENTOR(S) : Roger A. Resh et al.

Page 1 of 1

It is certified that error appears in the above-identified patent and that said Letters Patent is hereby corrected as shown below:

Title Page
Item (73) delete "Seagate Technology, LLC" and insert --Seagate Technology LLC--

Signed and Sealed this

First Day of September, 2009

David J. Kappos
*Director of the United States Patent and Trademark Office*